June 3, 1958     D. R. CRAIG ET AL     2,837,657
RADIOGRAPHIC METHOD AND APPARATUS
Filed Nov. 19, 1954
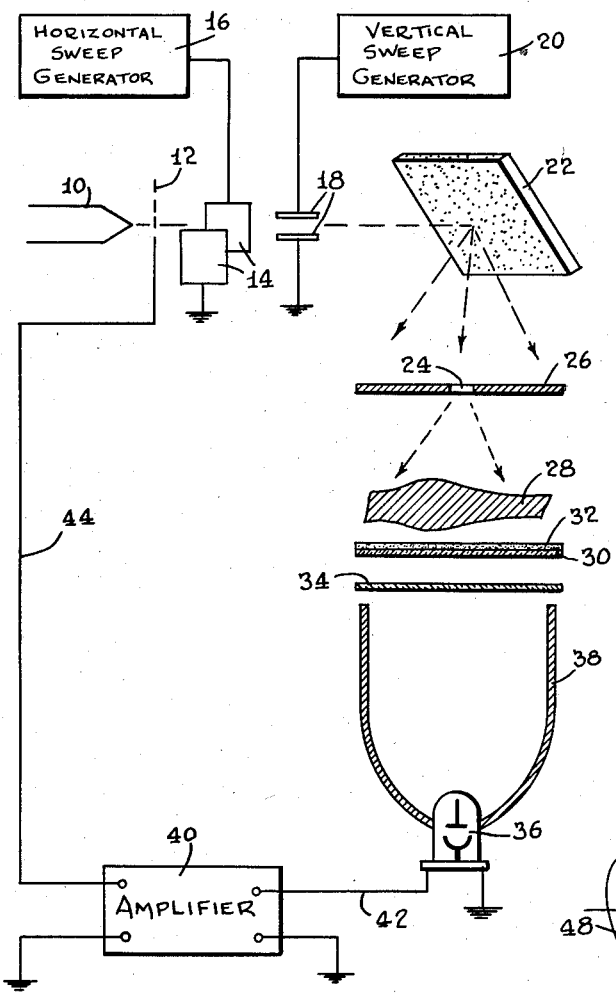
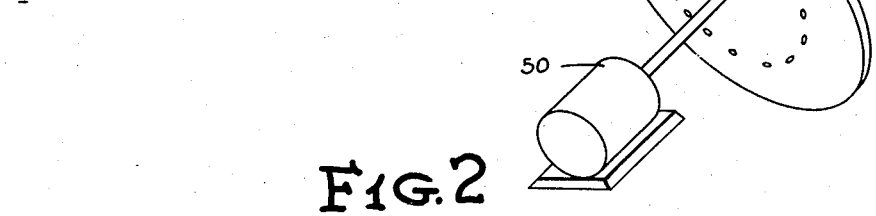
INVENTORS
DWIN R. CRAIG
WILLIAM F. HAMILTON
BY
ATTORNEY

United States Patent Office 2,837,657
Patented June 3, 1958

2,837,657

RADIOGRAPHIC METHOD AND APPARATUS

Dwin R. Craig, Falls Church, Va., and William F. Hamilton, Rockville, Md., assignors, by mesne assignments, to LogEtronics, Inc., Alexandria, Va., a corporation of Delaware Application November 19, 1954, Serial No. 470,112

8 Claims. (Cl. 250—65)

This invention relates to a radiographic method and apparatus permitting the average exposure of film to be maintained substantially constant so that details of both very dense and very light regions of a subject can be recorded on a single film sheet.

The production of X-ray films by conventional procedures invariably results in overexposed areas and underexposed areas where there is any appreciable variation in the density and/or the thickness of the subject. Moreover, in order to penetrate the denser regions with conventional procedures, the entire subject must be exposed to the full intensity and for the entire time required by such regions with the result that portions of the subject are frequently exposed excessively from the standpoints of intensity and time, a practice which has been found to be dangerous in connection with living tissue.

In accordance with the present invention, these objections to conventional procedures have been overcome by scanning the subject with an X-ray beam whose intensity is modified automatically as a function of the intensity of X-rays penetrating the subject. Among the many advantages accruing from the method and apparatus contemplated herein are the reduction of the average dose of X-rays to which the subject is exposed; the use of high intensity only when scanning the denser or thicker regions of the subject; the maintenance of a substantially constant average exposure of the film producing details of even the very dense and very light regions of the subject; the reduction of the average power required by the X-ray generator; the use of a fixed exposure time for all subjects without requirement for preliminary measurements, guesswork or manual adjustments; and improvement of definition due to minimization of the scattering of rays passing through light regions of the subject into the shadows of denser regions.

It is among the objects of the present invention to provide a radiographic method comprising energizing an X-ray source to produce a variable X-ray beam, directing the beam on a portion of a subject to produce a spot of finite area, scanning the subject with the spot and forming a shadow image thereof on an X-ray sensitive surface, sensing the intensity of X-rays transmitted from said surface, and modifying the beam as a function of the sensed intensity to maintain the average exposure of all portions of the X-ray sensitive surface substantially constant. The X-rays sensed are preferably transmitted through the X-ray sensitive surface and the sensed intensity modifies the current and/or the voltage energizing the source. The subject will ordinarily be scanned in two dimensions along paths having substantially linear components whose ratio of repetition rates is other than an integer.

It is also among the objects of this invention to provide radiographic apparatus comprising a source of X-rays, intensity controlled means for the source, means for directing a divergent X-ray beam along a path towards a subject, a sensing device disposed in the path more remote from the source than from the subject and responsive to X-rays penetrating the subject, the sensing device having an output circuit including the control means for regulating the intensity of X-rays, and means for supporting an X-ray sensitive film intermediate the subject and sensing device. It is contemplated that one form of sensing device include scintillation and photosensitive elements. A beam control element is employed to cause the beam to scan the subject and ordinarily, in two dimensions.

A more complete understanding of the invention will follow from a description of the accompanying drawing wherein:

Fig. 1 is a diagrammatic representation of one form of apparatus illustrating the invention; and Fig. 2 is a somewhat diagrammatic isometric representation of a modified form of scanning element for use with conventional X-ray sources.

The scanning X-ray tube depicted in Fig. 1 is similar to that proposed in "Science," issue of October 6, 1950, by R. J. Moon, of the University of Chicago, wherein a beam of electrons is deflected vertically and horizontally as desired to scan an X-ray emitting target, a portion of the emitted rays passing through a small hole provided in a lead shield to provide the scanning beam. In this case, the cathode 10 produces electrons in the form of a beam, the intensity of which is regulated by a control electrode 12, the horizontal deflection of which is controlled by deflection plates 14 connected in circuit with a horizontal sweep generator 16 and the vertical deflection of which is controlled by plates 18 in circuit with a vertical sweep generator 20. The electron beam thus produced and controlled is directed on a target 22 which produces X-rays, a portion of which will be directed through an aperture 24 provided in a lead shield 26 and diverge towards a subject 28 arranged in their path. Also arranged in the path of the X-ray beam, more remote from the source than from the subject is a film 30 provided with an X-ray sensitive coating 32 for producing a record of the portion of the subject scanned. X-rays penetrating the film 30 and transmitted therefrom strike a scintillating element 34 to produce visible light whose intensity is a function of the intensity of the X-rays exciting the element 34, so that a photosensitive element 36, such as a photomultiplier tube receives the visible light with the aid of a collector 38 and energizes an amplifier 40 through a lead 42. The output of the amplifier is connected by means of a lead 44 to the control element or electrode 12 of the scanning X-ray tube so as to modify the intensity of the electron stream impinging on the target 22 as a function of the intensity of the X-rays striking the scintillating element 34.

In practice, the greater the intensity of the X-rays striking the scintillating element 34, the greater will be the excitation of the photocell or photomultiplier tube 36 to produce a negative feed-back effect on the control element 12 to reduce the intensity of the electron stream and thereby reduce the intensity of the X-ray beam directed towards and through the subject. Similarly, as the intensity of the X-rays striking the scintillating element 34 decreases, the intensity of the electron stream will increase to reestablish a higher X-ray intensity, tending to produce a substantially uniform exposure of the sensitive coating 32 carried by the film 30.

The scanning disc 46 depicted in Fig. 2 contains apertures 48 arranged in the form of a spiral, to be rotated by a motor 50 between a conventional source of X-rays and a subject to produce results comparable with those achieved with the arrangement of Fig. 1.

Whereas the present invention has certain aspects in common with the disclosure of application Serial No. 453,747, filed September 2, 1954, each is productive of results not contemplated by the other. Whereas only one circuit has been depicted for illustration of the present invention, it should not be construed as limiting beyond the scope of the appended claims.

We claim:

1. A radiographic method comprising energizing an X-ray source to produce a variable X-ray beam, directing said beam on a portion of a subject to produce a spot of finite area, scanning said subject with said spot and forming a shadow image thereof on an X-ray sensitive surface, sensing the intensity of X-rays transmitted from said surface, and modifying said beam as a function of the sensed intensity to maintain the average exposure of all portions of the X-ray sensitive surface substantially constant, thereby reducing over-all contrast and maximizing detail contrast.

2. A radiographic method as set forth in claim 1 wherein the X-rays sensed are transmitted through said X-ray sensitive surface.

3. A radiographic method as set forth in claim 1 wherein the sensed intensity modifies the current energizing said source.

4. A radiographic method as set forth in claim 1 wherein the sensed intensity modifies the voltage energizing said source.

5. Radiographic apparatus comprising a source of X-rays, intensity control means for said source, means for directing a divergent X-ray beam along a path towards a subject, means for shifting said beam to scan said subject, a sensing device disposed in said path more remote from said source than from the subject and responsive to X-rays penetrating said subject, said sensing device having an output circuit including said control means for regulating the intensity of X-rays, and means for supporting an X-ray sensitive film intermediate said subject and sensing device, whereby a record having relatively low over-all contrast and relatively high detail contrast will be produced.

6. Radiographic apparatus as set forth in claim 5 wherein said sensing device includes scintillation and photosensitive elements.

7. Radiographic apparatus as set forth in claim 5 wherein a beam control element causes said beam to scan said subject.

8. Radiographic apparatus as set forth in claim 5 wherein a beam control element causes said beam to scan said subject in two dimensions.

References Cited in the file of this patent

UNITED STATES PATENTS

| | | |
|---|---|---|
| 2,401,289 | Morgan et al. | May 28, 1946 |
| 2,537,914 | Roop | Jan. 9, 1951 |
| 2,640,160 | Collins et al. | May 26, 1953 |

OTHER REFERENCES

"Scanning X-Ray Microscope" by Author Howard H. Pattee, Jr., in magazine Journal of the Optical Society of America, vol. 43, pages 61 and 62.

"Amplifying and Intensifying the Fluoroscopic Image by Means of a Scanning X-Ray Tube" by Author Robt. J. Moore in magazine Science, volume 112, October 6, 1950, pages 389–395.